May 26, 1964
C. J. CRETORS
3,134,510
POPPED CORN WARMER AND DISPENSER
Filed July 17, 1961
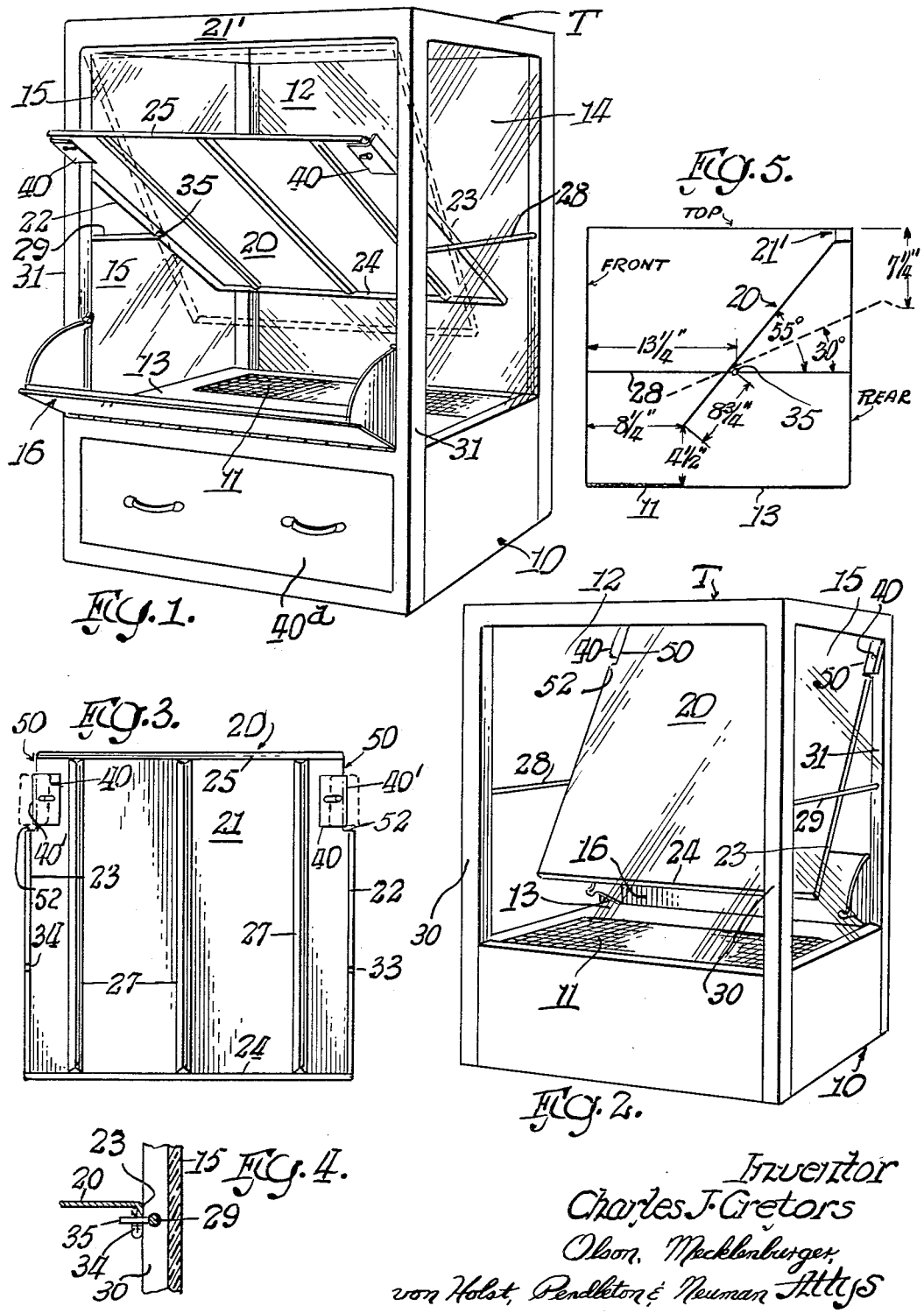
Inventor
Charles J. Cretors
Olson, Mecklenburger,
von Holst, Pendleton & Neuman Attys

United States Patent Office 3,134,510
Patented May 26, 1964

3,134,510
POPPED CORN WARMER AND DISPENSER
Charles J. Cretors, Highland Park, Ill., assignor to C. Cretors & Co., Chicago, Ill., a corporation of Illinois
Filed July 17, 1961, Ser. No. 124,481
11 Claims. (Cl. 222—156)

The invention relates generally to improvements in popped corn warmers, but it relates more particularly to popped corn warmers of the type adapted to store a substantial quantity of popper corn in a display cabinet from which smaller amounts are removed from time to time.

A good illustration of popped corn warmers of the type to which the invention relates is the type of warmer used in public places such as lobbies of theaters, concession areas, stores and the like where popped corn is sold and where an attractive and interesting display of the popped corn is a factor helpful in the sale of the product.

In popped corn warmers of this type, it has been customary to provide a cabinet having means in the base portion thereof for heating air and for discharging it into the popped corn storage area in the upper part of the cabinet, the upper part usually being composed of glass panels in order that the popped corn in the cabinet may be seen by the prospective purchasers.

In practice a relatively large volume of popped corn is stored in the warmer, being kept warm and crisp by means of circulated warm air. In order to make more effective display of the popped corn in the warmer, it has been the practice, in some instances, to provide a fixed inclined wall or baffle extending from the upper rear part of the cabinet of the warmer downwardly and forwardly to terminate above the bottom of the popped corn storage part of the cabinet and rearwardly of the front glass panel of the cabinet. The function of this inclined wall or baffle is to make a more effective display of a smaller quantity of popped corn since it gives the illusion of a larger volume of popped corn than actually is present.

In the use of such warmers or cabinets, the rear of the cabinet is provided with doors or other access means to the area below and rearwardly of the inclined wall or baffle. The attendant in the sale of popped corn removes the necessary quantity from beneath and rearwardly of the inclined wall, placing it in the conventional bags or other containers. As quantities of popped corn are thus removed, quantities of popped corn flow or move downwardly around the lower edge of the inclined baffle to replace the popped corn thus from time to time removed.

In the prior practice these baffles have been a fixed part of the cabinet. In order to replenish the popped corn an opening in the top of the cabinet has been provided. Such an arrangement is inconvenient for filling and also makes it difficult to keep the interior of the warmer cabinet in a clean and sanitary condition.

The general object of the invention is to provide a popped corn warmer of this type which shall be so constructed that it may be more conveniently supplied with popped corn as reqiured from time to time.

Another object of the invention is to provide a popped corn warmer cabinet construction which will be such as to facilitate the cleaning of the interior of the cabinet.

A further and more specific object of the invention is to provide a warmer construction in which the baffle or inclined wall can be readily removed from the cabinet and easily replaced and held in operative position.

A further object of the invention is to provide a warmer construction in which the inclined baffle or wall is arranged so that it may be moved from the position which it occupies for display purposes to a different position that will permit the placement of popped corn into the cabinet from a position at the rear of the cabinet.

A still further object of the invention is to provide a warmer construction in which the baffle member is pivotally mounted within the warmer cabinet in such a manner that it may be swung to a filling position permitting the replacement popped corn to be placed on the upper side of the baffle in the necessary quantity and the inclined wall or baffle then swung into operative position without compressing popped corn between the baffle and panels of the cabinet.

The foregoing objects, together with others, and the manner in which the objects are attained will be more readily understood by reference to the accompanying drawings illustrating the preferred embodiment of the invention in which:

FIGURE 1 is a rear perspective view of a popped corn warmer embodying the invention, the baffle member being shown by means of full lines swung to a position permitting the cabinet to be replenished with popped corn and by means of dotted lines in the operative position shown in FIG. 2;

FIG. 2 is a front perspective view of the warmer cabinet showing the inclined baffle member in the position which it occupies when the warmer is used for the display and sale of popped corn, as indicated by means of dotted lines in FIG. 1;

FIG. 3 is a bottom plan view of the baffle member removed from the warmer cabinet and on a scale enlarged with respect to FIGS. 1 and 2;

FIG. 4 is a fragmentary detail view illustrating the manner in which the baffle member is removably supported within the warmer cabinet; and FIG. 5 is a schematic view in vertical section through the popped corn storage part of the warmer, serving better to illustrate the relationship and angular disposition of the parts in one practical embodiment of the invention.

As before explained, cabinets of this general type have heretofore been devised for the purpose of displaying popped corn and for maintaining the popped corn in a warm and crisp condition. For this reason certain of the parts have not been illustrated in detail as they form no particular part of the invention.

Referring now to the drawings for the details of construction, the warmer comprises a cabinet having a base portion 10 in which there is located means for heating air and for blowing the heated air upwardly through the grill area 11 located in the forward part of the cabinet adjacent the front glass panel 12. The remainder of the top of the base portion 10 is covered with a horizontal imperforate plate member 13 which constitutes, with the grill 11, the top of the base 10 and the bottom or floor of the popped corn storage within the confines of the upper portion of the cabinet.

The cabinet also includes glass side panels 14, 15 and a top T. Although not shown, it is customary to provide swingable doors at the rear which can be closed when the swingable baffle or wall is in its operative position shown in FIG. 2.

At the rear of the cabinet there is provided a conventional drop apron 16 movable between the open position shown in FIG. 1 to permit easy access to the interior of the warmer cabinet below the inclined member 20 and the closed position shown in FIG. 2 when the warmer is acting as a storage and popped corn display cabinet in which the stored popped corn is kept in warm crisp condition by the circulated warm air.

Mounted for movement within the cabinet is a baffle or tray member 20. As shown it is of rectangular shape, substantially the width of the warmer cabinet, the other dimension being such that when it is in operative position, as is best shown in FIG. 2, it extends from the upper rear across bar 21' of the cabinet to a position on the order of four inches above the grill 11 and some eight inches rearwardly of the front glass panel 12. This angle is such that the popped corn which has been placed on the top of the baffle will flow downwardly and around the bottom edge of the baffle, some of the popped corn spreading rearwardly of the lower edge of the baffle until the angle of repose is reached. The wall or baffle 20 comprises a sheet metal member 21 bounded by downwardly extending side flanges 22, 23 and front and rear flanges 24, 25. The rear flange 25 is curved downwardly and outwardly, better to fit it into position under the cross member 21' of the cabinet when the baffle member is swung to closed position as shown in FIG. 2 and as indicated by means of dotted lines in FIG. 1.

In order to stiffen member 20 it is provided with reinforcing strips 27.

The baffle 20 is removably mounted for swinging movement within the warmer cabinet for which purpose there are provided just inwardly of the side panels 14, 15 rods 28, 29, respectively, which extend between and are supported in the upright members 30, 31 of the cabinet structure. The flanges 22, 23 of member 20 are cut away at 33, 34 to provide notches for the reception of pins 35 which are carried by and extend horizontally inwardly from the rods 28, 29. The detailed construction of this arrangement is best illustrated in FIG. 4 which shows a portion of one side of the member 20 and an adjacent rod 29. It will be understood that the other rod 28 has a similar pin which is received in the notch 33 of the flange 22.

As is clearly evident from FIGS. 1 and 4, the member 20 is mounted for swinging movement about the horizontal pins 35. Also, it will be evident that by lifting the member 20 upwardly, as a whole, the notches in the panel may be freed entirely from the supporting pins 35, thus permitting the entire member 20 to be withdrawn from the cabinet in a manner shortly to be explained. This makes it possible not only to clean the wall or baffle member 20 itself, but also to provide free access to all of the inner surfaces of the cabinet. Lifting and removal of the grill 11 is also possible so that it, likewise, can be cleaned and conveniently replaced. While the mechanism in the base portion 10 forms no particular part of the invention it might be stated that there is provided a drawer structure 40d which can be removed so as to permit access to the mechanism in the base part of the cabinet, the mechanism usually comprising air heating means and a blower to force warm air upwardly through the grill 11.

FIGURE 5 has been provided to illustrate in schematic form the angles which the baffle or wall 20 makes with respect to a horizontal plane, in closed position by means of full lines and in its open or popped corn filling position by means of dotted lines, and the relation of the pivot on which the member 20 rocks as obtains in one practical embodiment of the invention.

In this practical embodiment of the invention, the cabinet has a popped corn storage capacity of approximately nine cubic feet. The storage chamber has a depth from front to rear of approximately twenty-one inches, a width between the side cabinet panels of approximately twenty-four inches and a height between the bottom 13 and top T of slightly over twenty-four inches.

The cross rods 35 are located approximately 7½ inches above the bottom of the storage space. The wall or baffle 20 is approximately 24½ inches from its lower front edge to its upper rear edge.

From the schematic view it can be seen that when the baffle is in open or filling position there is ample space to dump the popped corn on the upper surface of the baffle 20.

It can be seen, also, that when the full amount of popped corn has been placed in the cabinet the baffle can be swung to closed position without danger of crushing the popped corn by engagement of the corn with the confronting front panel of the cabinet since the baffle in its swinging movement progressively assumes a steeper angle which causes additional quantities of the popped corn to flow downwardly over the lower front edge of the baffle. When the maximum amount of popped corn for which the cabinet is designed has been supplied and the fully closed position of the baffle has been reached, popped corn will extend from the front of the bottom part of the storage space to a short distance below the top of the cabinet, thus providing an attractive display of popped corn.

As before explained, some of the popped corn will fall rearwardly of the lower edge of the baffle until the angle of repose is reached. Popped corn is removed from this rearwardly extending popped corn mass as it is sold and when removed is replaced by like amounts falling downwardly and rearwardly over the front edge of the baffle as long as the supply in the cabinet lasts. Of course, if desired the cabinet can be refilled with a further supply of popped corn before all of the popped corn therein has been removed.

*Further Statement of Construction and Operation*

It should be noted that the upper rear marginal side portions of the baffle 20 are cut back as indicated at 50. Adjacent the cutaway areas of the baffle there are provided locking plates 40 slidable laterally between the full and dotted line positions shown in FIG. 3. When in the full line position shown in FIG. 3, the distance between the outer side faces 40' of the plates 40 is less than the distance between the rear openings defined by the upright rear corner members 31—31 of the warmer cabinet. The distance between the remainder of the side margins of the baffle 20, however, is greater than the distance between said uprights but slightly less than the distance between the glass side panels of the cabinet. Hence, when the baffle 20 is in position within the storage space the baffle can be swung downwardly until the offset portions 52 of the baffle engage the rear or inner faces of the rear upright cabinet members 31—31 which act as limiting stops to locate the baffle in the full line position shown in FIG. 1.

Assume that there is either no popped corn or insufficient popped corn in the cabinet or warmer and that the baffle or wall 20 is in a position supported for swinging movement as before described. In order to fill the warmer with the desired amount of popped corn, the member 20 is swung to the position indicated by full lines in FIG. 1 after having first retracted the plates 40. The area above the baffle or wall 20 is then completely filled with popped corn after which the member 20 is swung so that the rear edge moves upwardly and the front edge downwardly to the dotted line position shown in FIG. 1 and the full line position shown in FIG. 2. The pivot point or position for the baffle is so arranged that when the rear edge is thus swung upwardly into closed position the member 20 does not compress the popped corn which has been placed thereon against the front wall of the cabinet, but permits it freely to flow downwardly over the lower front edge and onto the grill 11, some of it also flowing rearwardly until the angle of repose is reached.

To hold the baffle or wall 20 in closed position the two locking plates 40 are moved laterally outward to dotted line position illustrated in FIG. 3 and the full line position shown in FIG. 2, at which time they are positioned forwardly of or behind the rear upright members 31—31 of the cabinet, thus preventing the baffle member from swinging downwardly as it would otherwise do because of the position of the pivot and the weight of the popped corn on the upper side of the baffle.

At any time it is desired to swing the baffle 20 to filling position it is only necessary to retract the locking plates 40 to the full line position shown in FIGS. 1 and 3 which permits them to pass through the space between the uprights 31—31.

Because the major part of the baffle is wider than the space between the uprights 31—31, to remove the baffle entirely from the storage chamber the baffle is lifted from its pivotal support and tilted or canted to a diagonal position which enables the baffle to pass through the rear opening. When so removed, both the baffle and interior of the cabinet are exposed to facilitate cleaning. The manner of replacing the baffle should be obvious.

I claim:

1. A cabinet for use in displaying and dispensing popped corn, means forming a storage chamber comprising a bottom, upright side wall portions, pivotally mounting a bottom, upright side wall portions and a substantially transparent upright front wall portion, a pivotally mounted and quickly detachable baffle member, and means for supporting the baffle member in a downwardly and forwardly inclined position in the chamber with the lower front edge of the baffle member spaced rearwardly of the front wall portion and above the chamber bottom, said supporting means being formed and adapted to permt the baffle to be swung between a closed operating position and an open filling position, the baffle when in operating position being inclined downwardly and forwardly more steeply than when swung to filling position.

2. The combination set forth in claim 1 in which the baffle member includes downwardly extending flange portions along its sides each of which is provided with a notch and the supporting means includes members carried by the cabinet structure which interfit with the notch of each baffle flange portion and access means defined by the rear of the cabinet structure such that said baffle member is easily removed and replaced.

3. The combination set forth in claim 1 plus means for holding the baffle in operating and filling positions.

4. A cabinet for use in displaying and dispensing popped corn, a storage chamber comprising a bottom and substantially transparent upright side and front walls, said chamber having a rear structure adapted to present a rear opening at least in the upper part of the cabinet, a removable baffle member, means for rotatably mounting the baffle member within the storage chamber for swinging movement between a downwardly and forwardly inclined operating position in which the lower edge of the baffle is spaced rearwardly of the upright front wall and above the bottom, and a relatively less steep filling position, said mounting means being formed and adapted to dispose the upper rear edge of the baffle when in filling position sufficiently below the top of the storage chamber to permit placing popped corn into the chamber through the open rear and upon the upper side of the baffle and when in closed operating position disposing the upper rear edge of the baffle in close proximity to the top of the storage chamber.

5. The combination set forth in claim 4 in which the means mounting the baffle for swinging movement is formed and adapted to dispose an upper rear portion of the baffle outwardly through the rear opening of the cabinet when the baffle is in filling position.

6. A cabinet for use in displaying and dispensing popped corn, a storage chamber comprising a bottom and substantially transparent upright side and front walls, said chamber having structure including rear upright corner frame members spaced to define a rear opening of less width than that of the chamber between the side walls at least in the upper part of the cabinet, a detachably and rotatably mounted baffle member having marginal side portions adjacent the top which are spaced apart a distance less than the width of said rear opening and other lower marginal side portions spaced apart a distance greater than the width of said rear opening as defined by said upright members but less than the distance between the chamber side walls, and means mounting the baffle member for swinging movement between a downward and forwardly inclined operative position in the chamber with the lower edge of the baffle spaced rearwardly of the upright front wall and a relatively less steep open filling position in which the upper baffle portion of reduced width is below the top of the storage chamber and projects at least in part into the opening between said rear upright corner members.

7. The combination set forth in claim 6 plus means for holding said baffle in one of said operative or filling positions.

8. The combination set forth in claim 6 plus means for holding said baffle in said operative and filling positions.

9. The combination set forth in claim 6 in which the means for mounting the baffle for swinging movement is formed and adapted to dispose the baffle at an angle of substantially 55 degrees when in operative position and substantially 30 degrees to the horizontal when in filling position.

10. The combination set forth in claim 6 in which the means for mounting the baffle for swinging movement comprises structure carried by the cabinet providing horizontal pivotal means operatively engaged with the baffle structure.

11. The combination set forth in claim 6 in which means are carried by the baffle shiftable between positions permitting the baffle to be swung to open or filling position and a position behind said corner posts preventing such swinging movement.

References Cited in the file of this patent

UNITED STATES PATENTS

| 428,877 | Angell | May 27, 1890 |
| 528,355 | Bain | Oct. 30, 1894 |
| 817,202 | Swahn | Apr. 10, 1906 |
| 1,762,530 | Sandell | June 10, 1930 |
| 2,785,036 | Elsden-King et al. | Mar. 12, 1957 |

UNITED STATES PATENT OFFICE
CERTIFICATE OF CORRECTION

Patent No. 3,134,510                        May 26, 1964

Charles J. Cretors

It is hereby certified that error appears in the above numbered patent requiring correction and that the said Letters Patent should read as corrected below.

Column 1, line 11, for "popper" read -- popped --; line 28, before "more" insert -- a --; column 5, lines 10 and 11, strike out "pivotally mounting a bottom, upright side wall portions".

Signed and sealed this 22nd day of September 1964.

(SEAL)
Attest:

ERNEST W. SWIDER
Attesting Officer

EDWARD J. BRENNER
Commissioner of Patents